United States Patent
Weaver et al.

(10) Patent No.: US 11,767,125 B2
(45) Date of Patent: Sep. 26, 2023

(54) ARTICULATING BIFURCATED INTEGRATED TRANSITION DUCT ASSEMBLY

(71) Applicant: TEXTRON INNOVATIONS INC., Providence, RI (US)

(72) Inventors: Keith David Weaver, North Richland Hills, TX (US); Michael Pujol, Dallas, TX (US); Andrew Jordan Birkenheuer, Arlington, TX (US); Nicholas Plagianos, North Richland Hills, TX (US); Karl Burge, Hurst, TX (US); Thomas Mast, Carrollton, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 104 days.

(21) Appl. No.: 17/017,789

(22) Filed: Sep. 11, 2020

(65) Prior Publication Data

US 2021/0001995 A1 Jan. 7, 2021

Related U.S. Application Data

(62) Division of application No. 15/709,536, filed on Sep. 20, 2017, now Pat. No. 10,793,283.

(Continued)

(51) Int. Cl.
*B64D 33/08* (2006.01)
*B64C 27/12* (2006.01)
(Continued)

(52) U.S. Cl.
CPC .............. *B64D 33/08* (2013.01); *B64C 27/12* (2013.01); *F01P 1/06* (2013.01); *F01P 11/10* (2013.01); *F16H 57/0416* (2013.01)

(58) Field of Classification Search
CPC .......... B64D 33/08; B64D 33/10; F01P 11/10; F01P 5/06; B60K 11/06; B60K 11/08; F16H 57/0416
See application file for complete search history.

(56) References Cited

U.S. PATENT DOCUMENTS 5,427,502 A 6/1995 Hudson
5,588,482 A 12/1996 Holka
(Continued)

FOREIGN PATENT DOCUMENTS

AU 20161002684 A4 4/2016
EP 0013272 A1 7/1980
(Continued)

OTHER PUBLICATIONS

Bell Helicopter Textron Inc., "Bell 525 Relentless" Poster, Nov. 12, 2014.
(Continued)

*Primary Examiner* — Eric S Ruppert
(74) *Attorney, Agent, or Firm* — Edwin S. Flores; Daniel J. Chalker; Chalker Flores, LLP

(57) ABSTRACT

A transition duct assembly includes a shared connector, and a plurality of primary cooling pathways for cooling one or more systems or components. Each primary cooling pathway includes a transition duct in fluid communication with the shared connector, and a transition connector in fluid communication with the transition duct.

10 Claims, 13 Drawing Sheets

Related U.S. Application Data

(60) Provisional application No. 62/423,371, filed on Nov. 17, 2016, provisional application No. 62/399,097, filed on Sep. 23, 2016.

(51) Int. Cl.
*F01P 1/06* (2006.01)
*F01P 11/10* (2006.01)
*F16H 57/04* (2010.01)

(56) References Cited

U.S. PATENT DOCUMENTS

| | | |
|---|---|---|
| 2005/0201863 A1 | 9/2005 | Welsh et al. |
| 2005/0268593 A1 | 12/2005 | Hagshenas |
| 2014/0360445 A1 | 12/2014 | Reynolds et al. |

FOREIGN PATENT DOCUMENTS

| | | | |
|---|---|---|---|
| EP | 3299672 A1 | 3/2018 | |
| FR | 2762079 A1 * | 10/1998 | ........... B60K 11/085 |
| JP | 404297397 A | 10/1992 | |
| WO | 2016018498 A1 | 2/2016 | |

OTHER PUBLICATIONS

European Patent Office, European Search Report for EP Appl. No. 17192691.8 dated Feb. 12, 2018, 4 pp.

European Patent Office, Communication pursuant for Article 94(3) EPC for EP Appl. No. 17192691.8 dated Mar. 6, 2018, 6 pp.

European Patent Office, Communication pursuant for Article 94(3) EPC for EP Appl. No. 17192691.8 dated Jul. 20, 2018, 5 pp.

Perry, Dominic, "Analysis: Bell 525 Relentless cutaway and Technical Description" Flight International, Nov. 14, 2014, London, https://www.flightglobal.com/news/articles/analysisbell525relentlesscutawayandtechnical405541/.

* cited by examiner

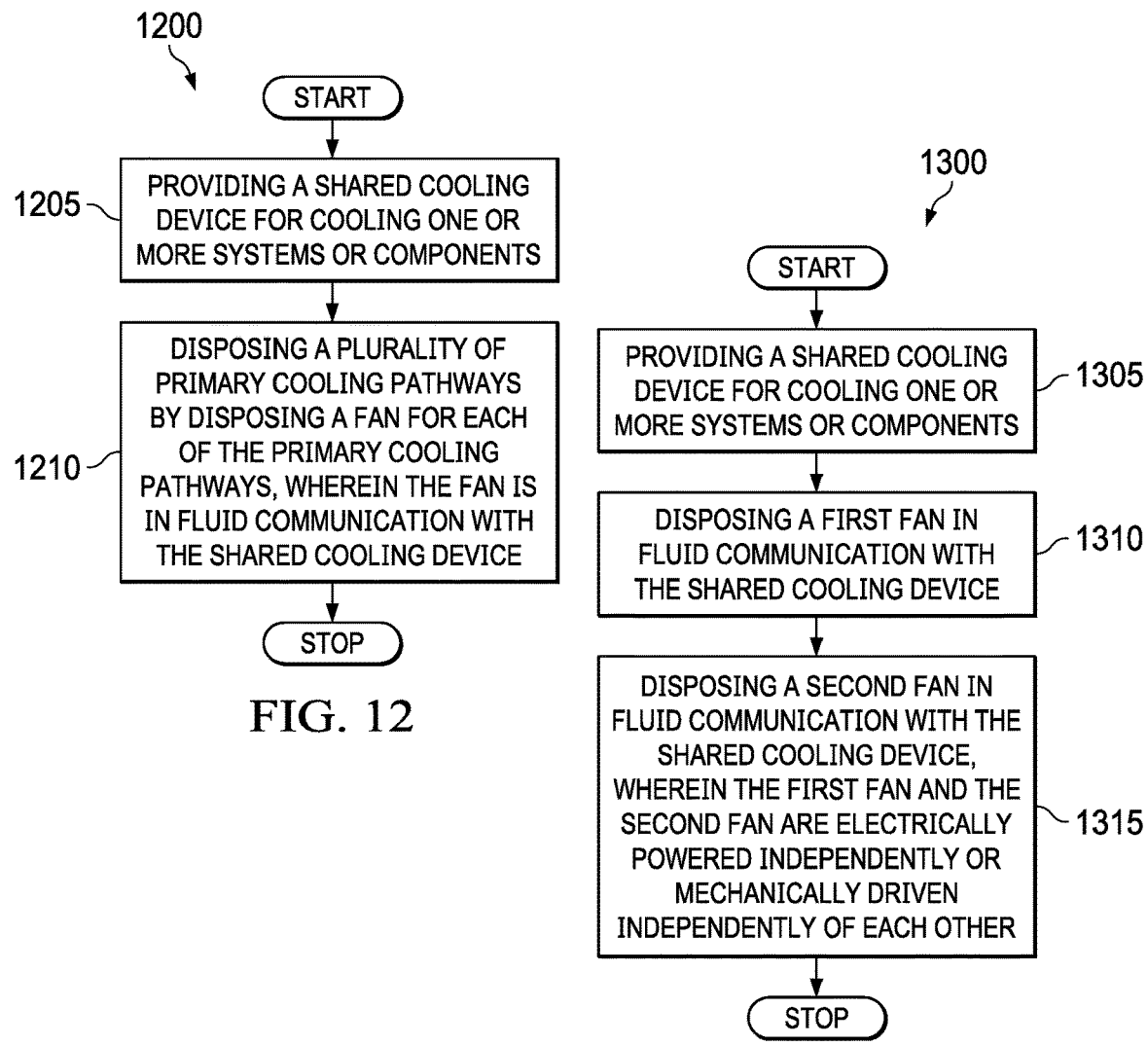

ARTICULATING BIFURCATED INTEGRATED TRANSITION DUCT ASSEMBLY

CROSS-REFERENCE TO RELATED APPLICATIONS

This patent application is a divisional of U.S. patent application Ser. No. 15/709,536 filed on Sep. 20, 2017, which claims priority to U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

Not applicable.

TECHNICAL FIELD OF THE INVENTION

The present invention relates in general to the field of rotorcraft, and more particularly to methods and systems for cooling rotorcraft systems.

BACKGROUND OF THE INVENTION

Without limiting the scope of the invention, its background is described in connection with rotorcraft drive systems.

Since their inception, rotorcraft and rotorcraft drive systems have been improved to reduce the possibility of failure during flight. Toward that end, a number of modifications have been made to drive systems to improve reliability. However, despite advances in materials and design, a number of failures continue to occur that affect rotorcraft performance. One example of a problem with current rotorcraft drive systems is that, in some instances, the failure of single drive system component leads to failure of the entire drive system. Another example is a loss of lubrication event that causes the loss of torque transmission by drive system subcomponents such as gearboxes or accessories connected to the main rotor gearbox.

More particularly, the failure of a single gearbox or shaft connected to the main rotor gearbox can significantly impact operations. For example, if there is a loss of lubrication to a gearbox, the gearbox loses torque transmission causing damage to upstream or downstream components. The same can occur when a shaft becomes unbalanced (or breaks), which can damage couplings, gearboxes and even the main rotor gearbox. Unfortunately, when a portion of a drive system experiences a failure or reduction in performance, the concomitant reduction in power leads to challenges with flight performance.

Thus, a need remains for improving the overall safety and reliability of rotorcraft drive systems that include the connections between the engines and the main rotor gearbox, reduction and accessory gearboxes, shafts, generators, oil pumps, and accessories connected to the main rotor gearbox.

Existing methods and apparatuses for cooling systems such as a main rotor gearbox and accessory gearboxes, and reduction gearboxes typically do not have a capacity for continued operation if components fail. If a fan fails, for example, existing methods and apparatuses typically have no ability to operate in the absence of the failed fan. Methods and apparatuses for providing redundancy for components of cooling systems in rotorcraft are desirable.

SUMMARY OF THE INVENTION

In some embodiments of the disclosure, a transition duct assembly includes a shared connector and a plurality of primary cooling pathways for cooling one or more systems or components. Each primary cooling pathway includes a transition duct in fluid communication with the shared connector, and a transition connector in fluid communication with the transition duct. In some embodiments, the transition ducts partially extend into the shared connector. In some embodiments, at least one partition (fixed, articulated or actuated) forms a plurality of channels within the shared connector, wherein each transition duct is in fluid communication with one of the channels within the shared connector. In some embodiments, the assembly further includes one or more secondary cooling pathways, wherein each of the one or more secondary cooling pathways comprises a conduit in fluid communication with the transition duct of one of the primary cooling pathways. In some embodiments, each conduit is operably configured to be placed in fluid communication with a distributed cooling device, the shared connector is operably configured to be placed in fluid communication with a shared cooling device, and/or each transition connector is operably configured to be placed in fluid communication with a fan. In some embodiments, the assembly includes two primary cooling pathways and at least one partition forming two channels, or two secondary cooling pathways.

In some embodiments of the disclosure, a method of directing fluid flow in a cooling system provides a shared connector, provides each of a plurality of primary cooling pathways for cooling one or more systems or components, wherein each of the primary cooling pathways is in fluid communication with the shared connector by disposing a transition duct in fluid communication with the shared connector, and disposing a transition connector in fluid communication with the transition duct. In some embodiments, the transition ducts partially extend into the shared connector. In some embodiments, the method also includes forming a plurality of channels within the shared connector using at least one partition (fixed, articulated or actuated), wherein each transition duct is in fluid communication with one of the channels within the shared connector. In some embodiments, the assembly further includes one or more secondary cooling pathways, wherein each of the one or more secondary cooling pathways comprises a conduit in fluid communication with the transition duct of one of the primary cooling pathways. In some embodiments, each conduit is operably configured to be placed in fluid communication with a distributed cooling device, the shared connector is operably configured to be placed in fluid communication with a shared cooling device, and/or each transition connector is operably configured to be placed in fluid communication with a fan. In some embodiments, the assembly includes two primary cooling pathways and at least one partition forming two channels, or two secondary cooling pathways. In some embodiments, each transition duct, conduit, shared connector, transition connector, or a combination thereof comprises at least a portion that is a rigid material, a flexible material, an articulated portion, a flexible portion, or a combination thereof.

In some embodiments of the disclosure, a rotorcraft includes a fuselage, one or more engines coupled to the fuselage and a transition duct assembly coupled to the fuselage. The transition duct assembly includes a shared connector, a plurality of primary cooling pathways for cooling one or more systems or components. Each primary cooling pathway includes a transition duct in fluid communication with the shared connector, and a transition connector in fluid communication with the transition duct. In some embodiments, the rotorcraft includes some of the additional components and/or functionality described above in reference to the transition duct assembly and method.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which:

FIG. 12 depicts a flowchart of a method of cooling one or more systems or components;

FIG. 13 depicts a flowchart of another method of cooling one or more systems or components;

FIG. 15 depicts a flowchart of a method of cooling one or more systems or components.

DETAILED DESCRIPTION OF THE INVENTION

Figure 1:
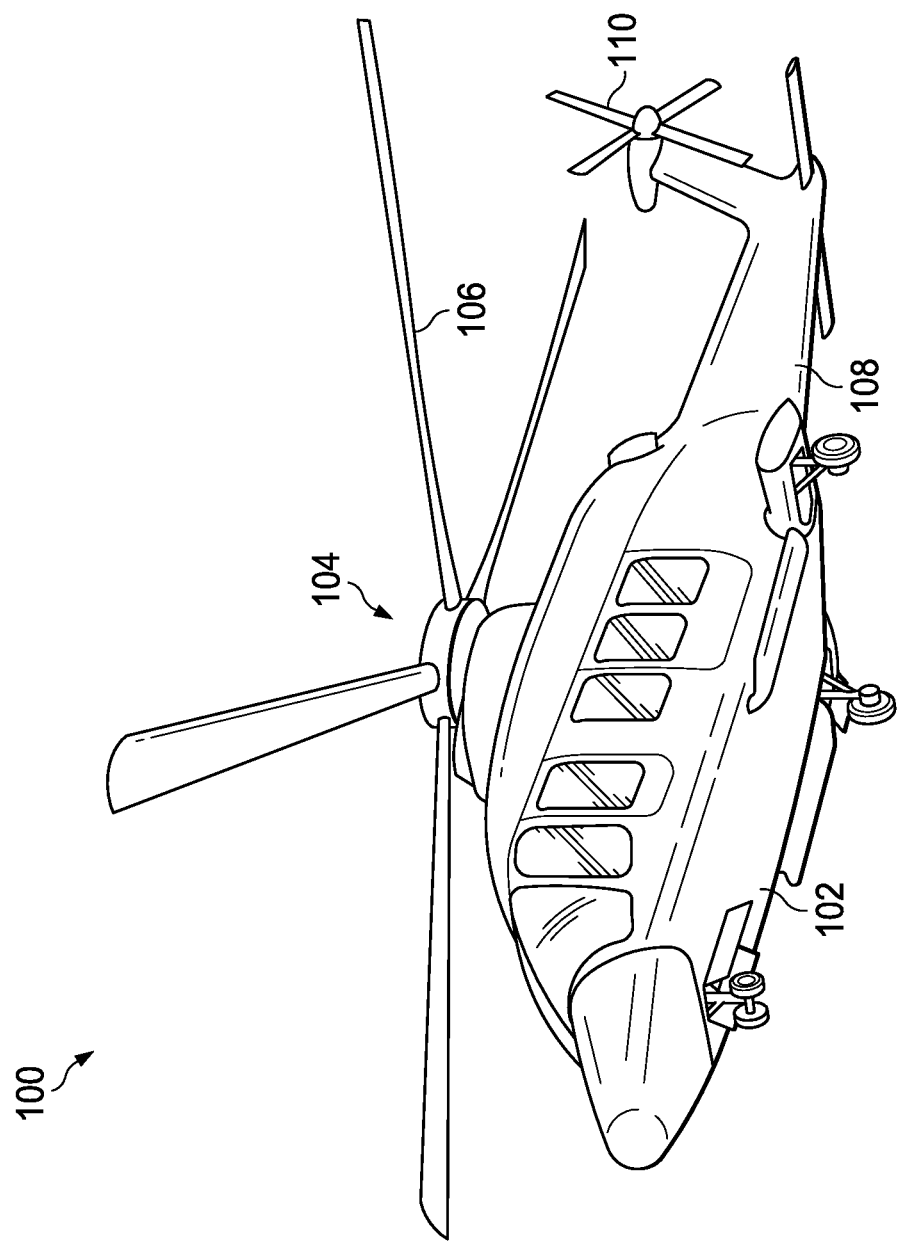
FIG. 1 shows a side view of a helicopter according to a particular embodiment of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention addresses the problems with drive systems in use today that are known to lead to rotorcraft failure. More particularly, the drive system of the present invention was designed to overcome drive system failures by including one or more of the following design features: (1) minimize the number of single path drive system components; (2) provide maximum system separation and redundancy; (3) minimize maintenance requirements and maintenance related incidents; (4) minimize the potential of loss of lubrication events; and/or (5) maximize main rotor gearbox loss of lubrication capability. The rotorcraft drive system described herein includes, e.g., dual engine reduction gearboxes completely isolated from the remainder of drive system via freewheeling clutches in the main rotor gearbox, dual accessory gearboxes separate from the main rotor gearbox, and the distribution of the gearbox driven accessories among the separate systems, among other improvements.

The present invention was developed to address the failures common to rotorcraft drive systems and is based on a completely new design and application of new technology to rotorcraft safety. More particularly, the new rotorcraft drive system is focused in an unparalleled manner on safety and redundancy. The goal of safety drove the design and development of the unique layout and configuration of the rotorcraft drive system described herein, which incorporates unique features and system separation that protects primary aircraft systems from the most common drive system failures. The drive system has also been designed to maximize the operational capability in the event of an uncommon failure, such as a loss of lubrication.

Moreover, the present inventors recognized that high-speed gearing and the associated heat generation is always an area of concern for gearbox survivability. The ability to continue torque transmission, particularly in a loss of lubrication scenario, is of great importance. For this reason, the drive system described herein includes two separate reduction gearboxes (RGB's), each one connected to a separate engine and independent from the Main Rotor Gearbox (MRGB). The reduction gearboxes are fully self-contained and separate from each other, each reducing the engine output speed from a high speed at or near turbine engine speed of greater than 10,000 RPM to a speed substantially lower than the high speed, a low speed of less than about 6,000 RPM, prior to transmitting torque to the MRGB. With this drive system arrangement high-speed gearing is contained in separate gearboxes, as such, the survivability of the total drive system is greatly enhanced, particularly in the event of high-speed gear failure or loss of lubricant in an individual RGB.

With this arrangement, where high-speed gearing is contained in separate gearboxes, the survivability of the total drive system is greatly enhanced, particularly in the event of high speed gear failure or loss of lubricant in an individual RGB. Each reduction gearbox can be disconnected from the MRGB by a clutch.

The Main Rotor Gearbox (MRGB) transmits torque from the Reduction Gearboxes (RGB) to the main rotor mast, to the accessory gearboxes, to the hydraulic pump and generator that is mounted to the MRGB, to the tail rotor drive shaft, and/or to the cooling fans.

The drive system and the associated cooling apparatus of the present invention can also take advantage of a number of additional features that minimize the possibility of loss of lubricant, to maximize the operational time if a loss of lubricant event does occur, and to maximize the operational time if a fan in the cooling apparatus fails. The cooling apparatus can include redundant fans, a transition duct between a shared cooler and the redundant fans that enable one fan to cool an engine or gearbox if a fans fails, and fan blade assemblies mounted on drive shafts or gearshafts without the need for high-speed grease-packed bearings. The drive system can also include one or more of the following: (1) the use of transfer tubes for cooler and filter mounting to eliminate the loss of lubricant in the event of loss of attachment fastener torque; (2) using an oil cooler mounted directly to the main rotor gearbox eliminating external hoses; (3) the use of all oil filter bowls are screw-on instead of held-on with small fasteners eliminating fastener failure issue from repeated removals; (4) the elimination of a high speed planetary and the heat generation associated with it during a loss of lubrication event; (5) the use of gear tooth geometry specifically designed to minimize sliding reducing heat generation at the teeth and the tendency to score during a loss of lubrication event; (6) the use of coarse pitch power gears with clearance or backlash allowing for the expansion during high heat loss of lubrication events; (7) the use of high hot hardness material utilized for primary torque carrying components maximizing their continued operation during a loss of lubrication event; (8) the use of ring gear and case joint design to efficiently transmit heat away from the planetary gears in the event of a loss of lubrication event; and/or (9) the use of isotropic super finished gear teeth resulting in a greatly improved surface finish and maximizing the ability of these gears to operate in a reduced lubrication environment.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
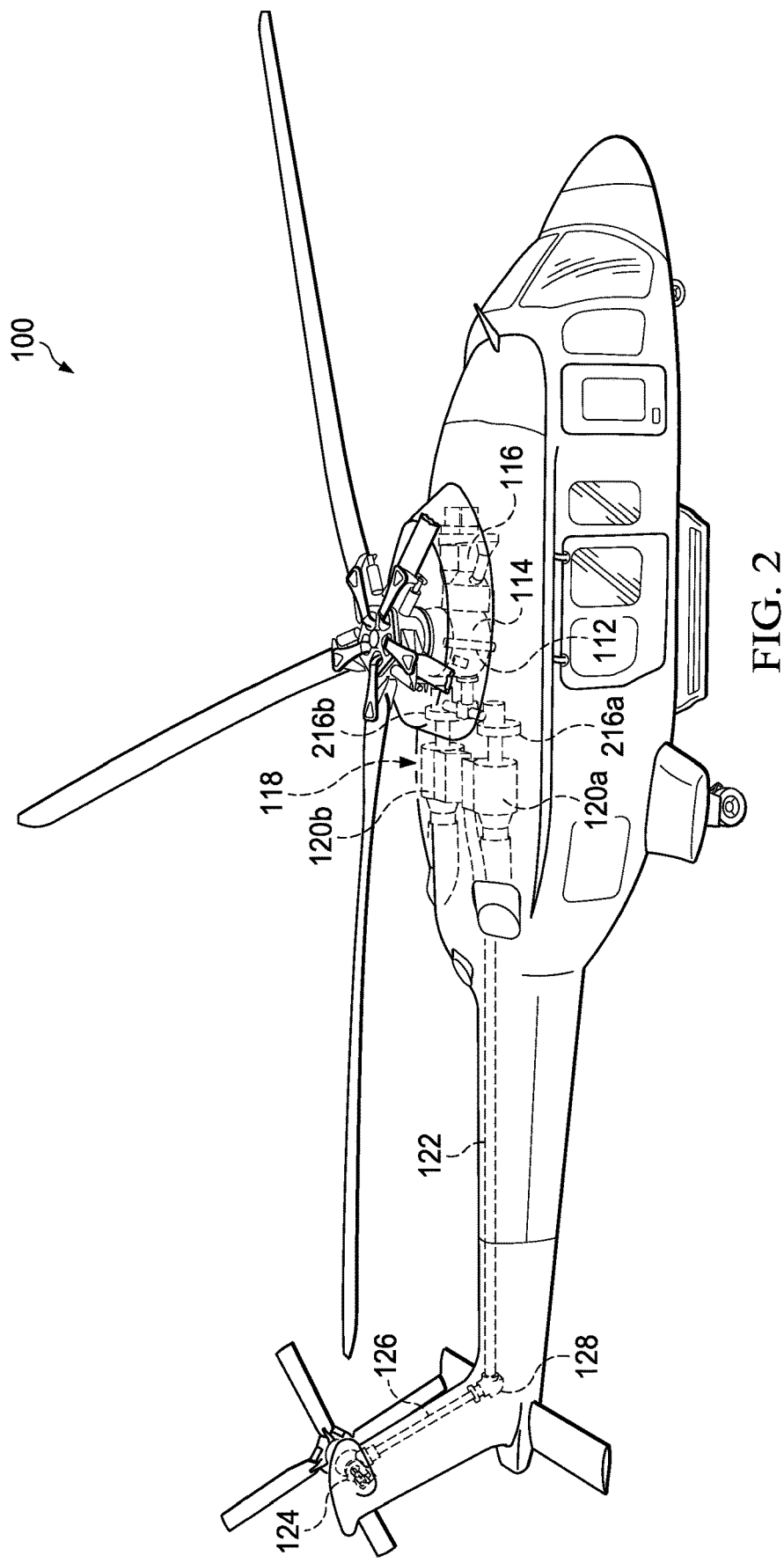
FIG. 2 shows a partial cross-section, perspective view of a helicopter according to an embodiment of the present application.

For example, FIG. 2 shows a partial cross-section perspective view of aircraft 100 that includes additional detail of the present invention. Aircraft 100 further includes a rotor mast 112, which is connected to the main rotor gearbox 114 via a main rotor mast. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation to the tail rotor gear box 124, which is connected via tail rotor drive shaft 126 and intermediate gear box 128.

Figure 3A:
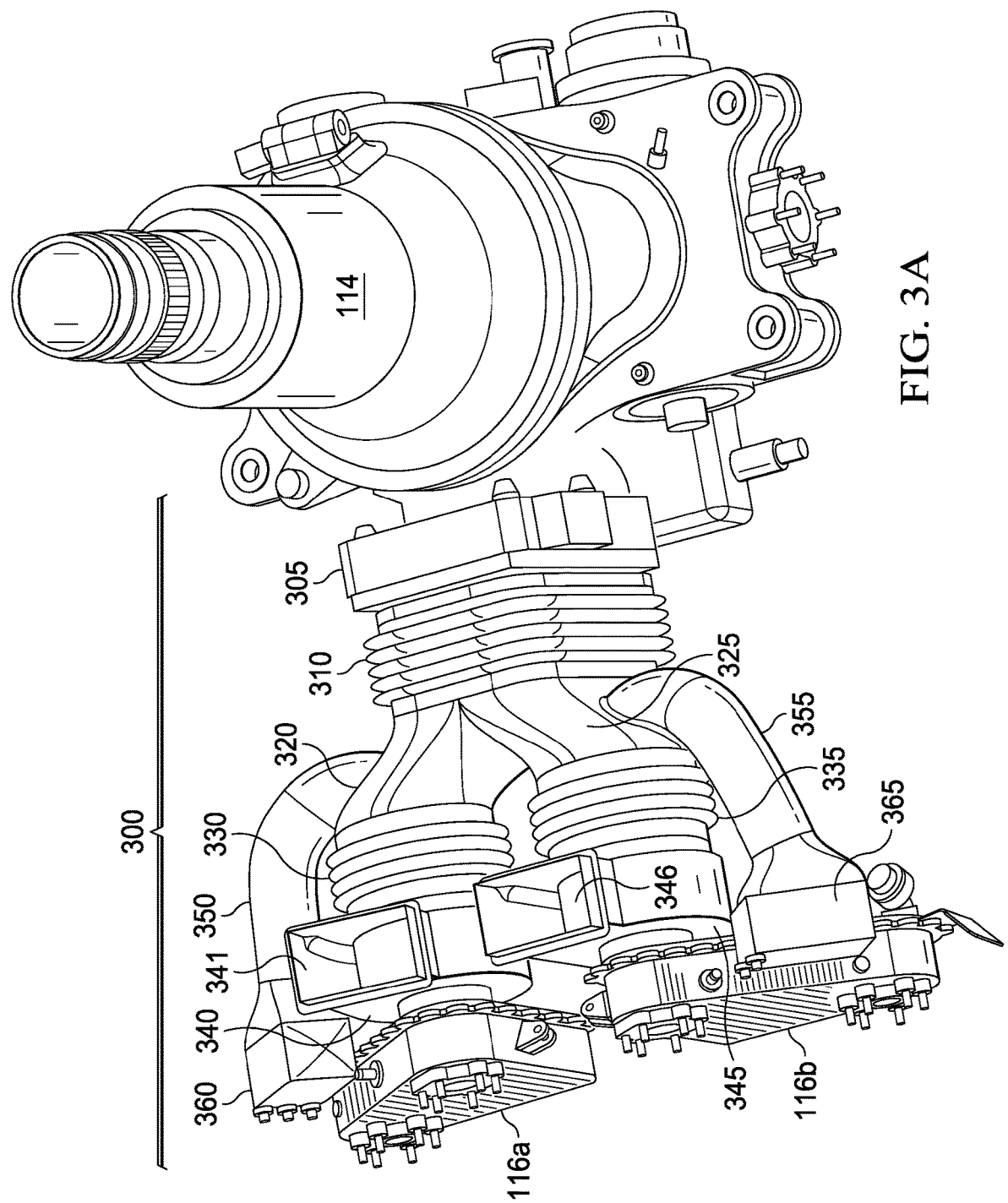
FIG. 3A shows a perspective view of a cooling system.

FIG. 3A shows a perspective view of an embodiment of the present invention, cooling apparatus 300. Cooling apparatus 300 includes a shared cooling device 305 through which air is drawn to cool a coolant such as oil. In FIG. 3A, shared cooling device 305 is illustrated as operably coupled with main rotor gearbox 114 to cool oil circulated through main rotor gearbox 114, but the skilled artisan will recognize that cooling apparatus 300 may be used to cool other components with oil or other coolants. Shared cooling device 305 is exemplary; other types of cooling mechanisms such as one or more coolers or heat exchangers may be used for the same purpose. Shared cooling device 305 is in fluid communication through shared connector 310 with first transition duct 320 and second transition duct 325.

In some embodiments, the first and second transition ducts 320 and 325 partially extend into the shared connector 310 to provide system redundancy in the event of a failed blower. Note that complete separation of the flow paths is not required so long as there is adequate path separation to provide the required system redundancy. In other embodiments, shared connector 310 includes partition 315 (not shown) that forms two channels within shared connector 310. One of the channels is in fluid communication with first transition duct 320 and the other channel is in fluid communication with second transition duct 325. Shared connector 310 is illustrated here as articulated or actuated to permit relative movement between shared cooling device 305 and the first transition duct 320 and second transition duct 325. First transition duct 320 is in fluid communication with first transition connector 330 and second transition duct 325 is in fluid communication with second transition connector 335.

First transition connector 330 is in fluid communication with first fan 340, which expels air through first exhaust port 341, and second transition connector 335 is in fluid communication with second fan 345, which expels air through second exhaust port 346. First fan 340 or second fan 345 may be a centrifugal fan, an axial-flow fan, a cross-flow fan, or another type of fan as convenient in various circumstances. First fan 340 and second fan 345 are operably independent of each other, including being electrically powered independently or mechanically driven independently of each other. First transition connector 330 and second transition connector 335 are illustrated here as articulated or actuated to permit relative movement between first fan 340 and first transition duct 320 on the one hand and, on the other hand, between second fan 345 and second transition duct 325. The skilled artisan will recognize that items in fluid communication may be in direct fluid communication, with the items in physical proximity, or in indirect fluid communication, with the items that are in fluid communication separated by other items. A transition duct, such as first transition duct 320 and second transition duct 325, a transition connector, such as first transition connector 330 and second transition connector 335, or a shared connector, such as shared connector 310, may include at least a portion that is a rigid material, a flexible material, an articulated portion, a flexible portion, or a combination thereof.

Figure 10:
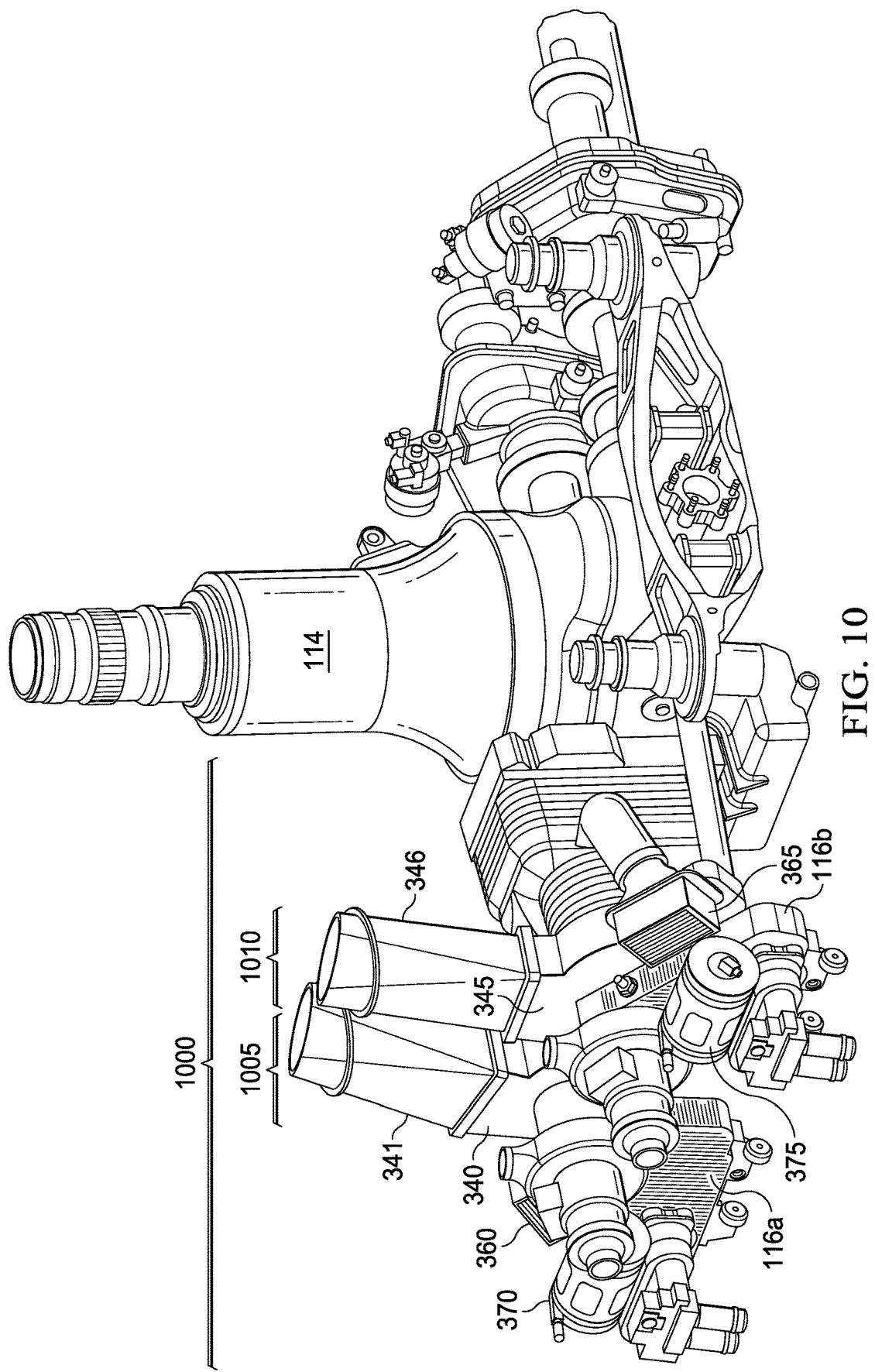
FIG. 10 depicts a perspective view of a redundant fan set in conjunction with a cooling apparatus.
Figure 11:
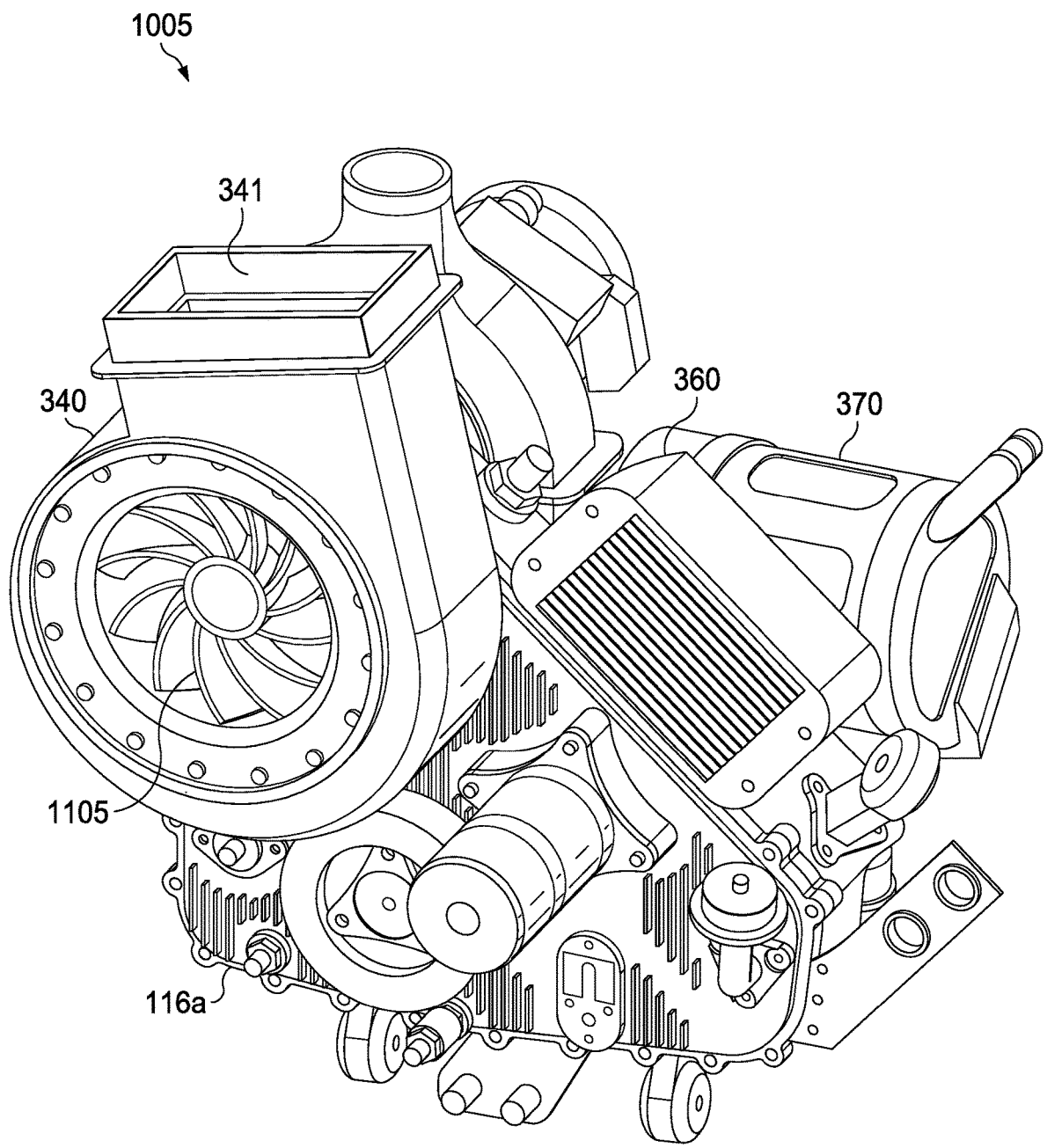
FIG. 11 depicts a perspective view of a fan assembly.

Continuing reference to FIG. 3A, first conduit 350 is in fluid communication with first transition duct 320 and second conduit 355 is in fluid communication with second transition duct 325. First distributed cooling device 360 (e.g., heat exchanger) is in fluid communication with first conduit 350, and second distributed cooling device 365 (e.g., heat exchanger) is in fluid communication with second conduit 355. First distributed cooling device 360 is a cooling system powered by first accessory gearbox 116a to cool a second hydraulic power pack 370 (FIGS. 10-11). Second distributed cooling device 365 is a cooling system powered by second accessory gearbox 116b to cool a third hydraulic power pack 375 (FIGS. 10-11). Air is drawn through first distributed cooling device 360 to cool oil circulated through first distributed cooling device 360 by a hydraulic pump in second hydraulic power pack 370 that is driven by the first accessory gearbox 116a. Likewise, air is drawn through second distributed cooling device 365 to cool oil circulated through second distributed cooling device 365 by a hydraulic pump in third hydraulic power pack 375 that is driven by the second accessory gearbox 116b. First distributed cooling device 360 and second distributed cooling device 365 are exemplary; other types of cooling mechanisms such as one or more coolers or heat exchangers may be used for the same purpose. A conduit, such as first conduit 350 and second conduit 355, may include at least a portion that is a rigid material, a flexible material, an articulated portion, a flexible portion, or a combination thereof.

First fan 340, first transition connector 330, and first transition duct 320 are included in a first primary cooling pathway and second fan 345, second transition connector 335, and second transition duct 325 are included in a second primary cooling pathway. First fan 340 draws air through the first primary cooling pathway from shared cooling device 305, which cools oil circulated through shared cooling device 305 from main rotor gearbox 114 and expels the heated air through first exhaust port 341. Second fan 345 draws air through the second primary cooling pathway from shared cooling device 305, which cools oil circulated through shared cooling device 305 from main rotor gearbox 114 and expels the heated air through second exhaust port 346. Cooling apparatus 300 is illustrated as having two primary cooling pathways from shared cooling device 305, but the skilled artisan will recognize that cooling apparatus 300 may have two or more such primary cooling pathways. The skilled artisan will also recognize that where there are more than two primary cooling pathways, shared connector 310 will have more than two channels, each of which is in fluid communication with a distinct transition duct. The skilled artisan will further recognize that where there are more than two primary cooling pathways, each cooling pathway includes a fan, and all of the fans are operably independent of each other, including being electrically powered independently or mechanically driven independently of each other. A transition connector, such as first transition connector 330 and second transition connector 335, may include at least a portion that is a rigid material, a flexible material, an articulated portion, a flexible portion, or a combination thereof. The skilled artisan will recognize that a cooling pathway, such as the first and second primary cooling pathways herein, may have more or fewer items than those illustrated or discussed herein.

First conduit 350 and first distributed cooling device 360 are included in a secondary cooling pathway and second conduit 355 and second distributed cooling device 365 are included in a secondary cooling pathway. First distributed cooling device 360 cools oil from second hydraulic power pack 370 that is circulated by a hydraulic pump in second hydraulic power pack 370 driven by the first accessory gearbox 116a. Likewise, second distributed cooling device 365 cools oil from third hydraulic power pack 375 that is circulated by a hydraulic pump in third hydraulic power pack 375 driven by the second accessory gearbox 116b. First fan 340 draws air from first distributed cooling device 360 through first conduit 350 and first transition duct 320, and it expels the air through first exhaust port 341. Second fan 345 draws air from second distributed cooling device 365 through second conduit 355 and second transition duct 325, and it expels the air through second exhaust port 346.

In an embodiment of cooling apparatus 300 with more than two primary cooling pathways, there is a single shared cooling device 305, a single shared connector 310, and three or more primary cooling pathways, each with a transition duct corresponding to first transition duct 320 and second transition duct 325, a transition connector corresponding to first transition connector 330 and second transition connector 335, and a fan corresponding to first fan 340 and second fan 345. In an aspect of cooling apparatus 300, there may be a secondary cooling pathway including a conduit corresponding to first conduit 350 and second conduit 355 and a distributed cooling device corresponding to first distributed cooling device 360 and second distributed cooling device 365. The skilled artisan will recognize that a cooling pathway, such as the first and second secondary cooling pathways herein, may have more or fewer items than those illustrated or discussed herein.

Figure 3B:
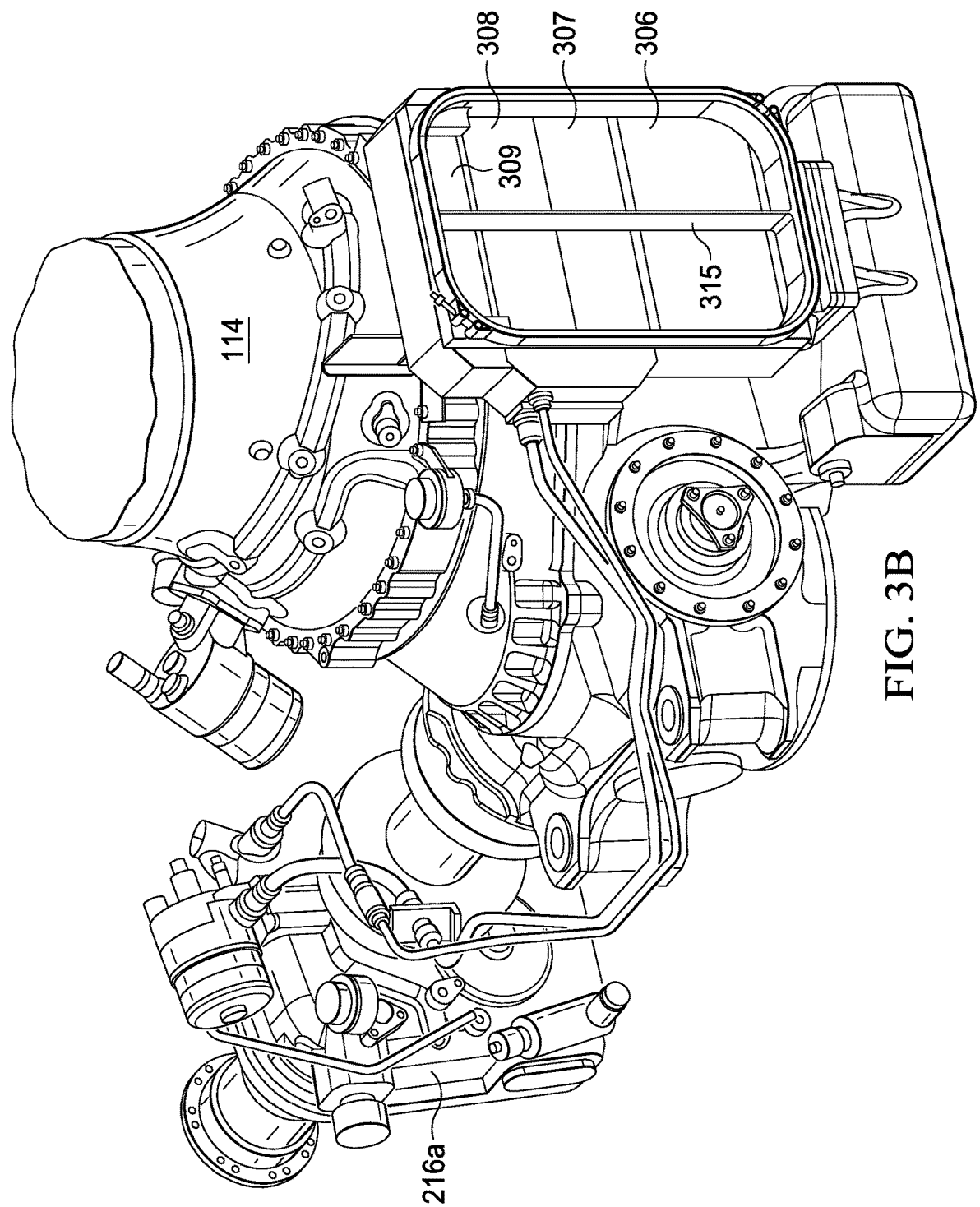
FIG. 3B illustrates a transmission system and the interior view of shared cooling device.

FIG. 3B illustrates a transmission system and an interior view of shared cooling device 305, which includes one or more exemplary cores, e.g., main rotor gearbox core 306, left-hand reduction gearbox core 307, right-hand gearbox core 308, and hydraulic systems core 309. Each of these cores in this multicore shared cooling device 305 is in fluid communication with shared connector 310 (not shown), and each of the cores is oriented to partition 315 such that airflow through cooling apparatus 300 can be maintained for cooling all of the systems or components served by these cores—main rotor gearbox 114, reduction gearboxes, one or more hydraulic systems, one or more lubrication systems, or one or more thermal control systems (such as other cooling systems or heating systems)—when both first fan 340 and second fan 345 are functioning and when only one fan, either first fan 340 or second fan 345, is operating, e.g., in the event of a fan failure. With the cores oriented perpendicular or orthogonal to the partition 315, air drawn through either the first primary cooling pathway or the second primary cooling pathway, in the event of a fan failure, or both cooling pathways in normal operations, flows through all of the cores, main rotor gearbox core 306, left-hand reduction gearbox core 307, right-hand gearbox core 308, and hydraulic systems core 309. Although the orientation of the cores is shown to be generally perpendicular or orthogonal to the partition 315, the skilled artisan will recognize that the cores and inlets to the cores may be made in other shapes and orientations such that the airflow across the cores can be other than perpendicular, e.g., at a 15, 20, 30, 45, 60, 80, or 85 degree angle while still providing airflow across the cores. Each core of the one or more cores included in shared cooling device 305 can be oversized to have sufficient cooling capacity to cool all of the systems or components coupled to it to maximize operational time in the event of a fan failure. As previously discussed, partition 315 is not required if the transition ducts partially extend into the shared connector 310 to provide sufficient separation such that system redundancy is provided in the event of a failed blower. Note that complete separation of the flow paths is not required as long as there is adequate path separation to provide the required system redundancy. In this case, the cores can be generally oriented to the transition ducts extending into the shared connector 310. When partition 315 is used, it can be fixed, articulated or actuated. To provide improved redundancy, partition 315 can be articulated or actuated to increase airflow across a greater area of shared cooling device 305 by moving to one side on shared connector 310, allowing air drawn through the primary cooling path of the operating fan to draw air over most or all of each of the cores, e.g., main rotor gearbox core 306, left-hand reduction gearbox core 307, right-hand gearbox core 308, and hydraulic systems core 309. Hydraulic systems core 309 cools a first hydraulic power pack (not shown).

Figure 4:
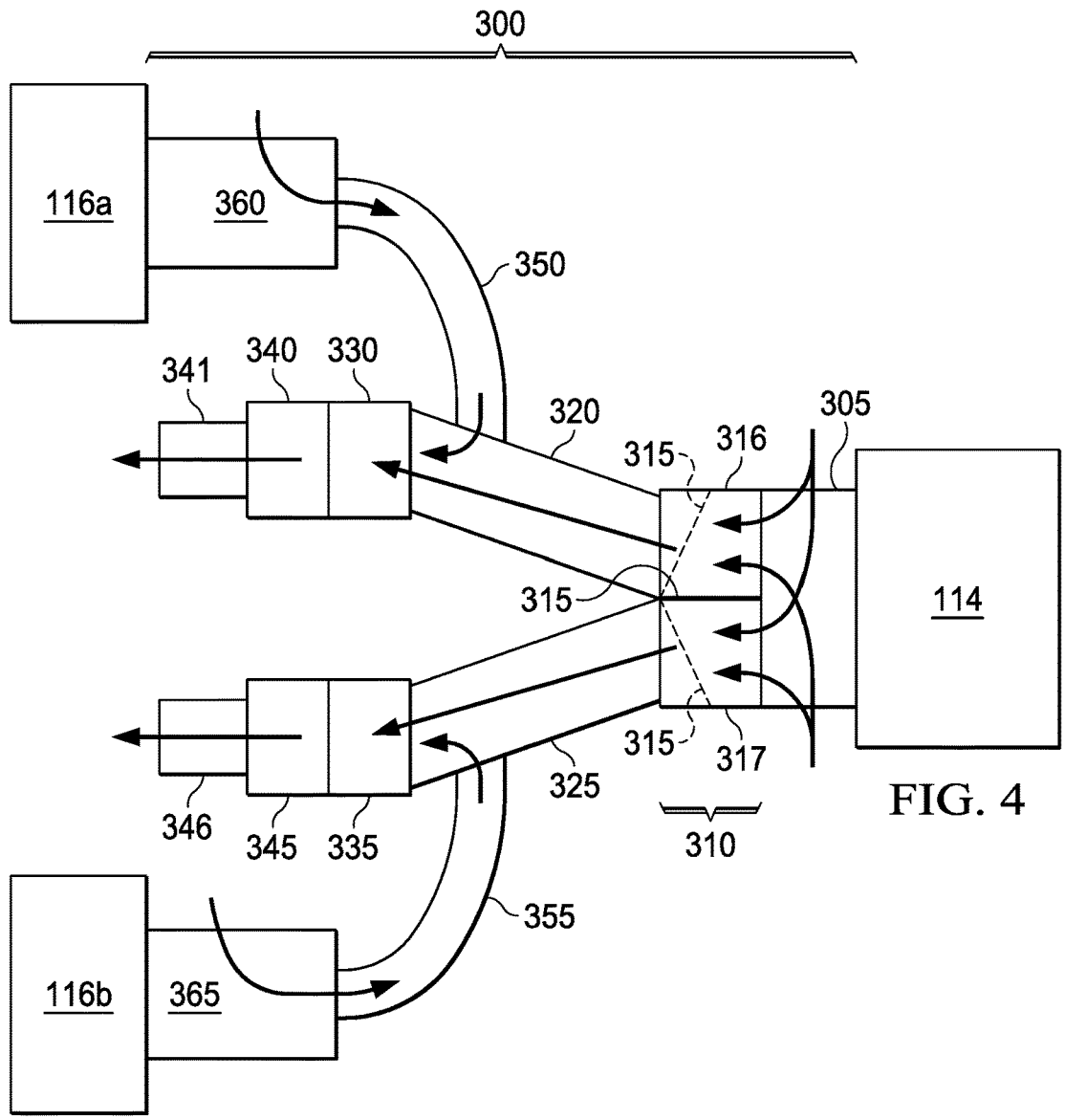
FIG. 4 shows a simplified diagram of a cooling apparatus.

FIG. 4 depicts a simplified diagram of cooling apparatus 300. FIG. 4 shows main rotor gearbox 114, shared cooling device 305, shared connector 310, partition 315 (optional), first channel 316, second channel 317, first transition duct 320, second transition duct 325, first transition connector 330, second transition connector 335, first fan 340, first exhaust port 341, second fan 345, second exhaust port 346, first conduit 350, second conduit 355, first distributed cooling device 360, second distributed cooling device 365, first accessory gearbox 116a, and second accessory gearbox 116b. Arrows depict airflows through the primary and secondary cooling pathways from the shared cooling device 305 and from the first distributed cooling device 360 and second distributed cooling device 365 through first fan 340 and second fan 345 and out through first exhaust port 341 and second exhaust port 346. In some embodiments, partition 315 is eliminated and the partition functionality is provided by the length in which the ducts 320 and 325 extend forward into connector 310. In some other embodiments, partition 315 is fixed in place. In yet some other embodiments, partition 315 can be articulated or actuated to move to one side or the other of shared connector 310 in the event of a fan failure, allowing air drawn through the primary cooling path of the operating fan to draw air over most or all of each of the cores included in shared cooling device 305. In FIG. 4, partition 315 is depicted as a solid line in the position in which air is drawn through both the first and second primary cooling pathways and as dotted lines in the positions in which partition 315 is moved to one side or the other of shared connector 310.

Here, cooling apparatus 300 is shown operably coupled with main rotor gearbox 114, first accessory gearbox 116a and second accessory gearbox 116b to power shared cooling device 305, first distributed cooling device 360 and second distributed cooling device 365, respectively. The skilled artisan will recognize that cooling apparatus 300 may be operably coupled to cool other systems or components than those specifically described herein, such as the first accessory gearbox 116a, second accessory gearbox 116b, first reduction gearbox 216a, second reduction gearbox 216b, other hydraulic systems, one or more lubrication systems, or one or more thermal control systems. The skilled artisan will also recognize that cooling apparatus 300 may be used with other cooling mechanisms besides coolers such as shared cooling device 305, first distributed cooling device 360, and second distributed cooling device 365.

Figure 5:
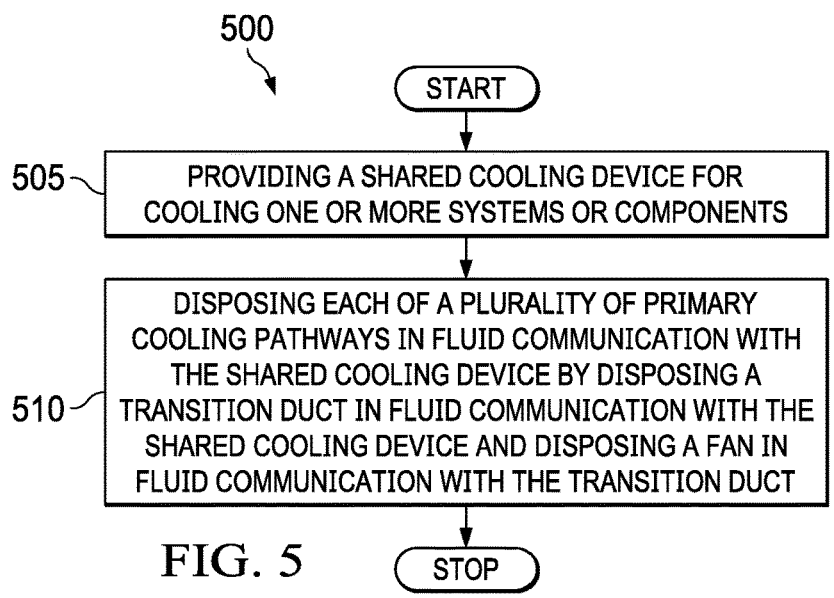
FIG. 5 depicts a flowchart of a method of cooling one or more systems or components.

FIG. 5 depicts a flowchart of a method 500 of cooling one or more systems or components, illustrating an embodiment of the present invention. Method 500 includes block 505, providing a shared cooling device 305 for cooling one or more systems or components, such as the main rotor gearbox 114, the accessory gearboxes 116a, 116b, one or more components driven by the accessory gearboxes 116a, 116b, reduction gearboxes 216a, 216b, one or more hydraulic systems (e.g., first hydraulic power pack), one or more lubrication systems, or one or more thermal control systems, and further includes block 510, disposing each of a plurality of primary cooling pathways in fluid communication with the shared cooling device 305 by disposing a transition duct, such as first transition duct 320 or second transition duct 325, in fluid communication with the shared cooling device 305 and disposing a fan, such as first fan 340 or second fan 345, in fluid communication with the transition duct.

Figure 6:
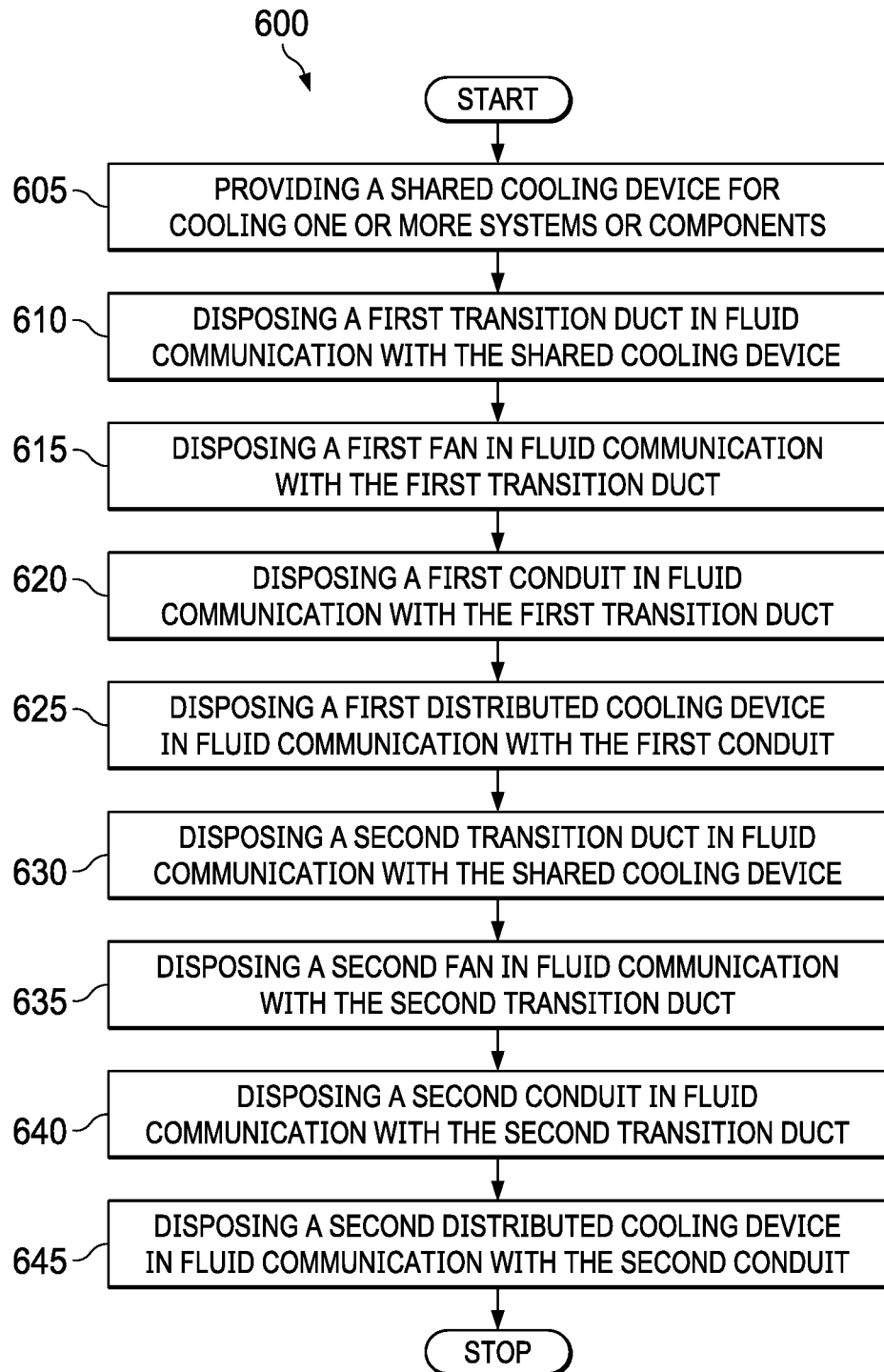
FIG. 6 depicts a flowchart of another method of cooling one or more systems or components.

FIG. 6 depicts a flowchart of a method 600 of cooling a component, illustrating another embodiment of the present invention. Method 600 includes block 605, providing a shared cooling device 305 for cooling one or more systems or components, such as the main rotor gearbox 114, the accessory gearboxes 116a, 116b, one or more components driven by the accessory gearboxes 116a, 116b, the reduction gearboxes 216a, 216b, one or more hydraulic systems (e.g., first hydraulic power pack), one or more lubrication systems, or one or more thermal control systems. Method 600 further includes block 610, disposing a first transition duct 320 in fluid communication with the shared cooling device 305. Method 600 further includes block 615, disposing a first fan 340 in fluid communication with the first transition duct 320. Method 600 further includes block 620 disposing a first conduit 350 in fluid communication with the first transition duct 320. Method 600 further includes block 625, disposing a first distributed cooling device 360 in fluid communication with the first conduit 350. Method 600 further includes block 630, disposing a second transition duct 325 in fluid communication with the shared cooling device 305. Method 600 further includes block 635, disposing a second fan 345 in fluid communication with the second transition duct 325. Method 600 further includes block 640, disposing a second conduit 355 in fluid communication with the second transition duct 325. Method 600 further includes block 645, disposing a second distributed cooling device 365 in fluid communication with the second conduit 355.

The skilled artisan will recognize that cooling apparatus 300 and methods 500 and 600 of cooling a system or component provide safety-enhancing redundant cooling for aircraft systems or components by providing more than one cooling pathway for the system or component to be cooled, permitting continued operations if a cooling pathway becomes inoperative.

Figure 7:
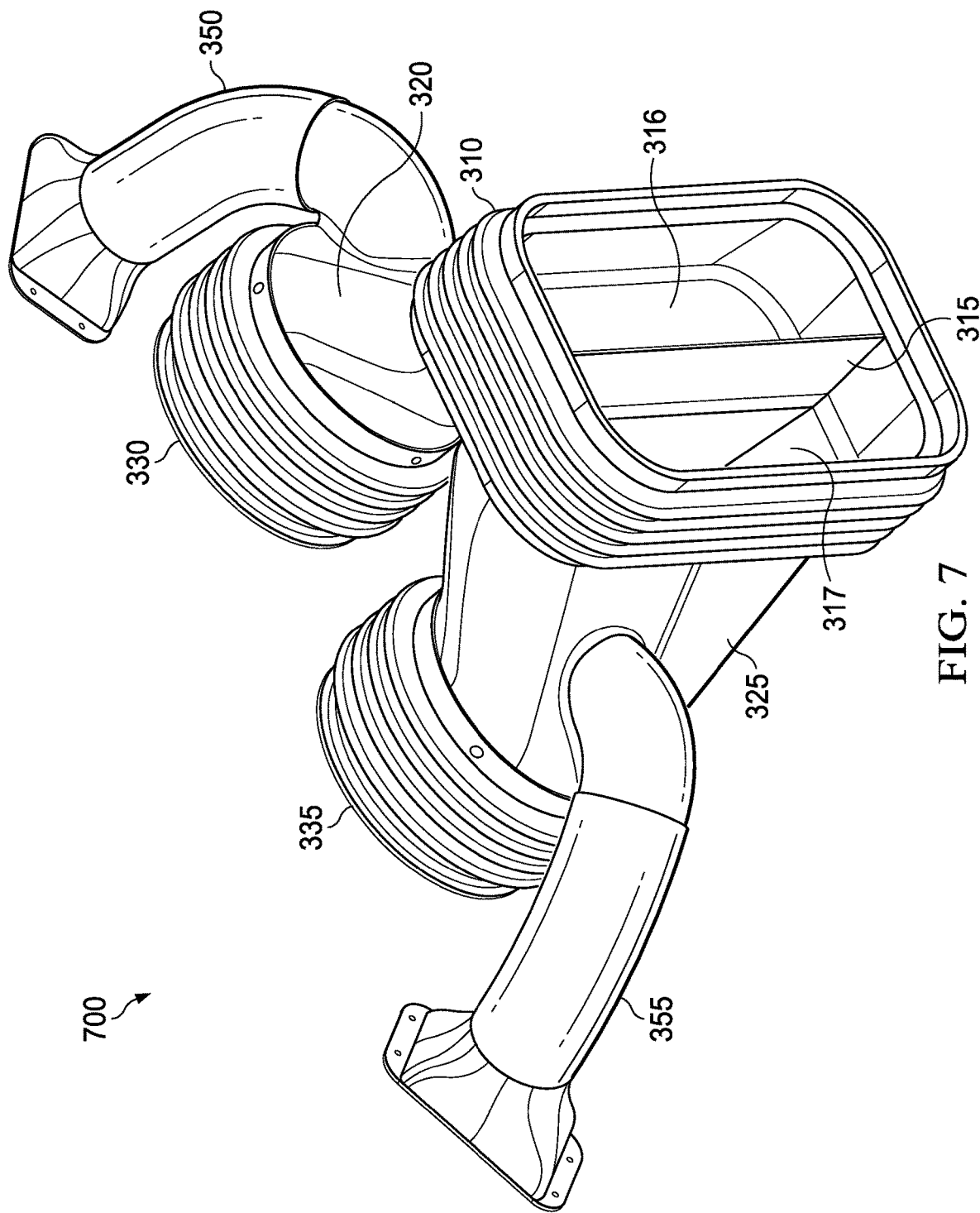
FIG. 7 depicts a perspective view of a transition duct assembly.

FIG. 7 shows a perspective view of an embodiment of the present invention, transition duct assembly 700. Transition duct assembly 700 includes a shared connector 310. Within shared connector 310, partition 315 (optional) forms first channel 316 and second channel 317 within shared connector 310. Transition duct assembly 700 is exemplary of any type of mechanical connection or connections that places ducts and fans in fluid communication. In some embodiments, partition 315 is eliminated and the partition functionality is provided by the lengths by which the ducts 320 and 325 extend forward into connector 315. In some other embodiments, partition 315 is fixed in place. In yet some other embodiments, partition 315 can be articulated or actuated to increase airflow across a greater area of shared cooling device 305. In an embodiment in which transition duct assembly 700 is part of cooling apparatus 300, in normal operations with both first fan 340 and second fan 345 operating, first channel 316 is in fluid communication with first transition duct 320, and second channel 317 is in fluid communication with second transition duct 325. First transition connector 330 is in fluid communication with first transition duct 320 and second transition connector 335 is in fluid communication with second transition duct 325. First conduit 350 is in fluid communication with first transition duct 320 and second conduit 355 is in fluid communication with second transition duct 325. When partition 315 is moved to one side or the other of shared connector 310, one of first channel 316 or second channel 317 is closed off and the remaining open channel is usable through which to draw air through either first transition duct 320 or second transition duct 325 to cool the systems or components cooled by shared cooling device 305.

Figure 8:
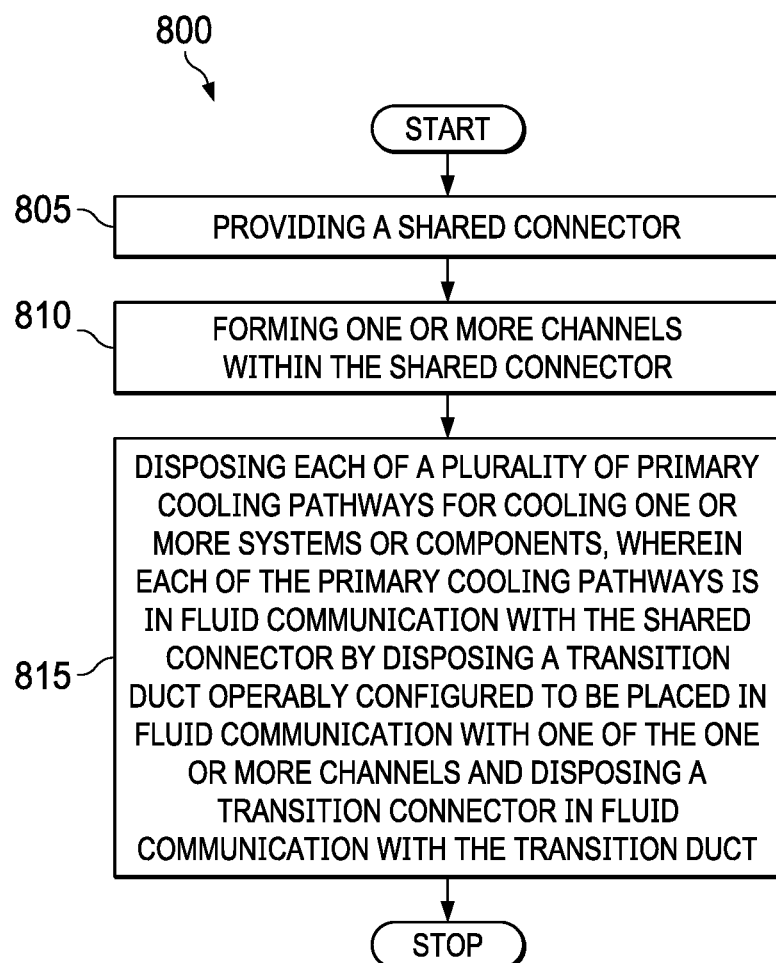
FIG. 8 depicts a flowchart for a method of directing fluid flow in a cooling apparatus.

FIG. 8 depicts a flowchart of a method 800 for directing fluid flow in a cooling apparatus such as cooling apparatus 300, illustrating an embodiment of the present invention. Method 800 includes block 805, providing a shared connector 310; optional block 810, forming a one or more channels, e.g. first channel 316 and second channel 317, within the shared connector 310; and block 815, providing each of a plurality of primary cooling pathways for cooling one or more systems or components, such as the main rotor gearbox 114, the accessory gearboxes 116a, 116b, one or more components driven by the accessory gearboxes 116a, 116b, the reduction gearboxes 216a, 216b, one or more hydraulic systems, one or more lubrication systems, or one or more thermal control systems, wherein each of the primary cooling pathways is in fluid communication with the shared connector 310 by disposing a transition duct, e.g., first transition duct 320 or second transition duct 325, operably configured to be placed in fluid communication with one of the plurality of channels, e.g., first channel 316 or second channel 317 (or the shared connector 310); and disposing a transition connector, e.g., first transition connector 330 or second transition connector 335, in fluid communication with the transition duct, e.g., first transition duct 320 or second transition duct 325.

Figure 9:
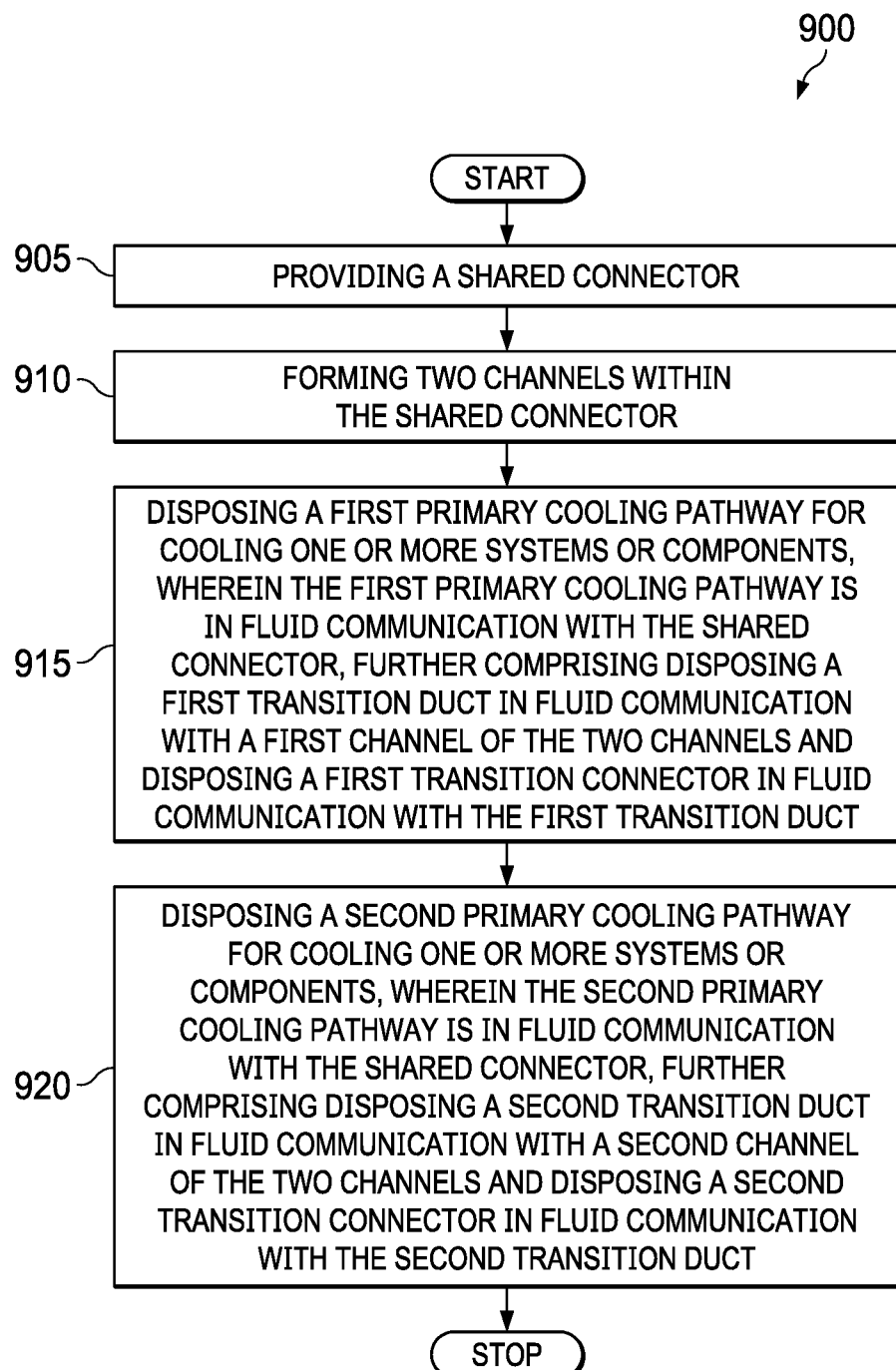
FIG. 9 depicts a flowchart for another method of directing fluid flow in a cooling apparatus.

FIG. 9 depicts a flowchart of a method 900 for directing fluid flow in a cooling apparatus such as cooling apparatus 300, illustrating an embodiment of the present invention. Method 900 includes block 905, providing a shared connector 310; block 910, forming two channels, first channel 316 and second channel 317, within the shared connector; block 915, disposing a first primary cooling pathway for cooling one or more systems or components, such as the main rotor gearbox 114, the accessory gearboxes 116a, 116b, one or more components driven by the accessory gearboxes 116a, 116b, the reduction gearboxes 216a, 216b, one or more hydraulic systems, one or more lubrication systems, or one or more thermal control systems, wherein the first primary cooling pathway is in fluid communication with the shared connector 310, further including disposing a first transition duct 320 in fluid communication with a first channel 316 of the two channels, first channel 316 and second channel 317, and disposing a first transition connector 330 in fluid communication with the first transition duct 320; and block 920, disposing a second primary cooling pathway for cooling one or more systems or components, such as the main rotor gearbox 114, the accessory gearboxes 116a, 116b, one or more components driven by the accessory gearboxes 116a, 116b, the reduction gearboxes 216a, 216b, or one or more hydraulic systems, one or more lubrication systems, or one or more thermal control systems, wherein the second primary cooling pathway is in fluid communication with the shared connector 310, further including disposing a second transition duct 325 in fluid communication with a second channel 317 of the two channels, first channel 316 and second channel 317, and disposing a second transition connector 335 in fluid communication with the second transition duct 325.

The skilled artisan will recognize that transition duct assembly 700 and methods 800 and 900 of cooling one or more systems or components provide safety-enhancing redundant cooling for aircraft systems or components by providing more than one cooling pathway for the system or component to be cooled, permitting continued operations if a cooling pathway becomes inoperative.

FIG. 10 shows a perspective view of an embodiment of the present invention, redundant fan set 1000, in conjunction with cooling apparatus 300. Redundant fan set 1000 includes two fan assemblies, the first fan assembly 1005 including first fan 340 and first exhaust port 341, and the second fan assembly 1010 including second fan 345 and second exhaust port 346. First fan 340 expels air through first exhaust port 341, and second fan 345 expels air through second exhaust port 346. First fan 340 and second fan 345 are operably independent of each other, including being electrically powered independently or mechanically driven independently of each other. If either fan fails, the other fan will continue to operate despite the failure. First fan 340 and second fan 345 each independently have the capacity to move air through a cooling apparatus such that the systems or components to be cooled can be cooled by either first fan 340 operating by itself or second fan 345 operating by itself. FIG. 10 also shows main rotor gearbox 114, first accessory gearbox 116a, second accessory gearbox 116b, second hydraulic power pack 370, third hydraulic power pack 375 of aircraft 100 as examples of components that require cooling.

FIG. 11 depicts a perspective view of first fan assembly 1005, including first fan 340, first exhaust port 341, and first fan blade assembly 1105. FIG. 11 also depicts first distributed cooling device 360, first accessory gearbox 116a and second hydraulic power pack 370.

FIG. 12 depicts a flowchart of a method 1200 of cooling one or more systems or components, illustrating an embodiment of the present invention. Method 1200 includes block 1205, providing a shared cooling device 305 for cooling one or more systems or components, such as the main rotor gearbox 114, accessory gearboxes 116a, 116b, one or more components driven by the accessory gearboxes 116a, 116b, reduction gearboxes 216a, 216b, or one or more hydraulic systems, one or more lubrication systems, or one or more thermal control systems, and also includes block 1210, disposing a plurality of primary cooling pathways by disposing a fan for each of the primary cooling pathways, wherein the fan, e.g., first fan 340 or second fan 345, is in fluid communication with the shared cooling device 305.

FIG. 13 depicts a flowchart of a method 1300 of cooling one or more systems or components, illustrating another embodiment of the present invention. Method 1300 includes block 1305, providing a shared cooling device 305 for cooling one or more systems or components, such as the main rotor gearbox 114, accessory gearboxes 116a, 116b, one or more components driven by the accessory gearboxes 116a, 116b, reduction gearboxes 216a, 216b, or one or more hydraulic systems, one or more lubrication systems, or one or more thermal control systems. Method 1300 further includes block 1310, disposing a first fan 340 in fluid communication with the shared cooling device. Method 1300 also includes block 1315, disposing a second fan 345 in fluid communication with the shared cooling device, wherein the first fan 340 and the second fan 345 are electrically powered independently or mechanically driven independently of each other.

The skilled artisan will recognize that redundant fan set 1000 and methods 1200 and 1300 provide safety-enhancing redundant cooling for aircraft systems or components by providing more than one fan for the system or component to be cooled, permitting continued operations if a fan becomes inoperative.

Figure 14:
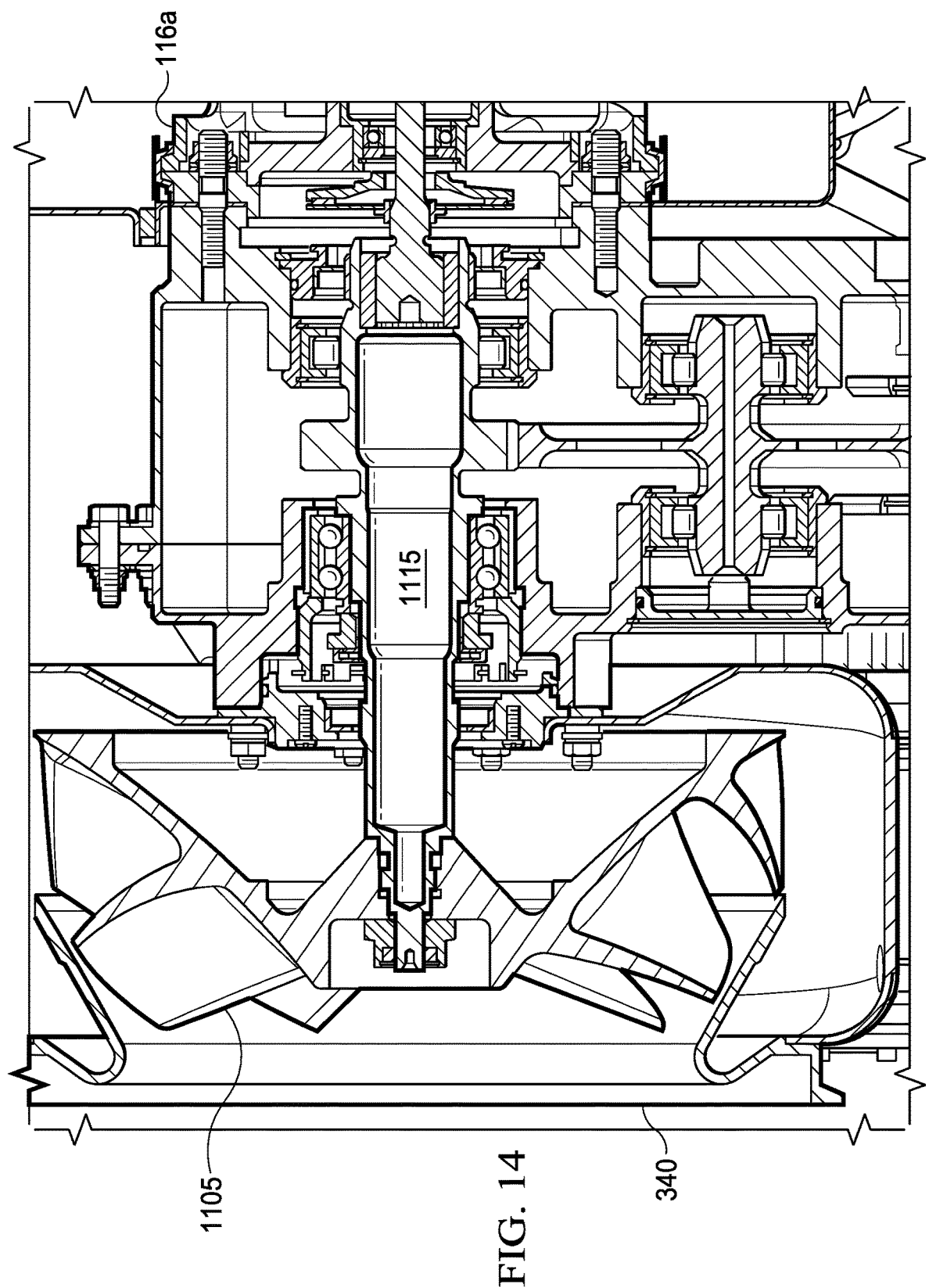
FIG. 14 depicts a fan blade assembly mounted on a shaft.

FIG. 14 depicts an embodiment of the present invention, a fan blade assembly mounted on a shaft. The skilled artisan will recognize that a shaft on which a fan blade assembly is mounted may be a drive shaft or a gearshaft. Shown here is first fan blade assembly 1105 of first fan 340 mounted on first gearshaft 1115. First gearshaft 1115 protrudes from and is operably coupled to first accessory gearbox 116a to be turned by first accessory gearbox 116a. First accessory gearbox 116a is a device for transmitting energy by rotating first gearshaft 1115. When first accessory gearbox 116a turns the first gearshaft 1115, first fan blade assembly 1105 turns with first gearshaft 1115. Thus, the operation of first accessory gearbox 116a turns first fan blade assembly 1105 of first fan 340, which draws air through first distributed cooling device 360, first conduit 350, first transition duct 320, and first transition connector 330 (not shown here; see FIGS. 3A and 4), to cool the second hydraulic power pack 370 and components driven by the first accessory gearbox 116a. Not shown here is a similar arrangement for second fan 345, in which second fan assembly of second fan 345 is mounted on a second gearshaft that protrudes from and is operably coupled to second accessory gearbox 116b to be turned by second accessory gearbox 116b, so that when second accessory gearbox 116b turns the second gearshaft, second fan 345 draws air to cool the third hydraulic power pack 375 and components driven by the second accessory gearbox 116b. Using a gearshaft in this manner drives each fan independently because each fan blade assembly is a on a separate gearshaft of a separate accessory gearbox. If one accessory gearbox fails and the associated fan blade assembly stops turning, another accessory gearbox, absent an independent failure, will continue to operate and will continue to draw air to cool the system or component being cooled by the cooling apparatus 300. The skilled artisan will recognize that a fan blade assembly may include an impeller, a rotor, or another assembly of blades associated with a fan or a blower generally.

FIG. 15 depicts a flowchart of a method 1500, a method for cooling a one or more systems or components, illustrating another embodiment of the present invention. Method 1500 includes block 1505, providing one or more fans, e.g., first fan 340 or second fan 345, wherein each of the one or more fans includes a fan blade assembly, e.g. first fan blade assembly 1105. Method 1500 further includes block 1510, operably coupling each of one or more shafts, e.g., first gearshaft 1115, to an engine or a gearbox, such as the engines 120a, 120b, the accessory gearboxes 116a, 116b, or the reduction gearboxes 216a, 216b, and wherein each fan blade assembly, e.g. first fan blade assembly 1105, of the one or more fans, e.g., first fan 340 or second fan 345, is disposed on one of the shafts e.g., first gearshaft 1115. The skilled artisan will recognize that each of a plurality of fan blade assemblies can be mounted on a shaft such as a gearshaft to provide as many shaft-mounted fan blade assemblies as may be needed for a given application.

The skilled artisan will recognize that method 1500 and mounting a fan blade assembly, such as first fan blade assembly 1105, directly on a gearshaft, such as first gearshaft 1115, eliminate the need for bearings to support the first fan blade assembly 1105, further eliminating the need for maintenance and replacement of bearings and enhancing safety.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components.

The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method of directing fluid flow in a cooling system, comprising:
    providing a shared connector comprising an articulatable partition that forms a plurality of channels within the shared connector, wherein the shared connector is operably couplable to a cooling apparatus;
    providing a plurality of primary cooling pathways for cooling one or more systems or components, wherein each of the primary cooling pathways is in fluid communication with a respective channel within the shared connector by:
        disposing a respective transition duct in fluid communication with a single respective channel within the shared connector; and
        disposing a respective transition connector in fluid communication with the respective transition duct, wherein articulation of the articulatable partition from a first to a second position allows for air flow over most or all of the cooling apparatus.

2. The method of claim 1, wherein the articulatable partition is articulated or actuated.

3. The method of claim 1, wherein:
    each respective transition duct comprises at least a portion that is a rigid material, a flexible material, an articulated portion, a flexible portion, or a combination thereof;
    the shared connector comprises at least a portion that is a rigid material, a flexible material, an articulated portion, a flexible portion, or a combination thereof; or
    each respective transition connector comprises at least a portion that is a rigid material, a flexible material, an articulated portion, a flexible portion, or a combination thereof.

4. The method of claim 1, further comprising disposing one or more secondary cooling pathways by disposing for each of the secondary cooling pathways a conduit in fluid communication with the transition duct of one of the primary cooling pathways.

5. The method of claim 4, wherein each conduit comprises at least a portion that is a rigid material, a flexible material, an articulated portion, a flexible portion, or a combination thereof.

6. The method of claim 4, wherein the conduit is operably coupled with a distributed cooling device.

7. The method of claim 1, wherein the shared connector is operably coupled with a shared cooling device.

8. The method of claim 1, wherein each respective transition connector is positioned in fluid communication with a fan.

9. The method of claim 1, wherein the forming a plurality of channels comprises forming two channels, and wherein the disposing a plurality of primary cooling pathways comprises disposing two primary cooling pathways.

10. The method of claim 9, further comprising disposing two secondary cooling pathways.

* * * * *